Aug. 19, 1930.   C. DORNIER   1,773,615

MOTOR ARRANGEMENT FOR AIRCRAFT

Filed Dec. 2, 1929

C. Dornier
INVENTOR

By Marks & Clerk
Attys.

Patented Aug. 19, 1930

1,773,615

UNITED STATES PATENT OFFICE

CLAUDE DORNIER, OF FRIEDRICHSHAFEN, GERMANY, ASSIGNOR OF ONE-HALF TO DORNIER-METALLBAUTEN G. M. B. H., OF FRIEDRICHSHAFEN, GERMANY

MOTOR ARRANGEMENT FOR AIRCRAFT

Application filed December 2, 1929. Serial No. 411,160.

Up to the present the propelment of land-airplanes usually consisted of either one or several motors arranged at the front of the plane-body and fixed above or below the plane wings. The drawback of using but one motor is, that in cases of derangements, the whole propelling power is lost. The provision of several motors on or below the wings has the disadvantage that the conduits and regulating rods between the seat of the pilot and the motors have to be comparatively long and to be provided at several places with turning devices.

According to the present invention the front part of the plane-body is provided with lateral outriggers carrying motor-cars, each with one motor with air-propellers at the front and rear ends. If required, supports with a motor-car and two more motors may be provided on the top of the front end of the plane-body, so that there would be altogether 3 motor-cars with 6 motors in all. The construction according to this invention has the advantage over the usual methods, that the motor plant can be divided into several smaller motors and that the power plant consisting of several motors being so near the pilot-seat that it can be well overlooked from there and that the regulating rods can be made short and without considerable turnings. In order to be able, in case of need, to exchange the whole propelment for another of equal or different capacity, the front end of the plane-body can be taken off. In this case the arrangement of the petrol and oil tanks is contemplated in the detachable front part of the airplane.

In the drawing, Fig. 1 is a front view of the airplane according to this invention.

Figure 1:
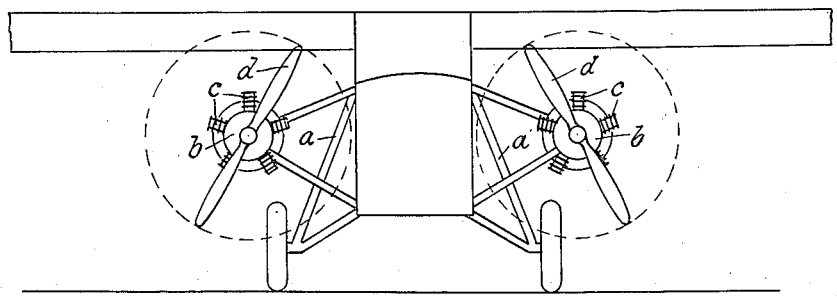
Figure 2:
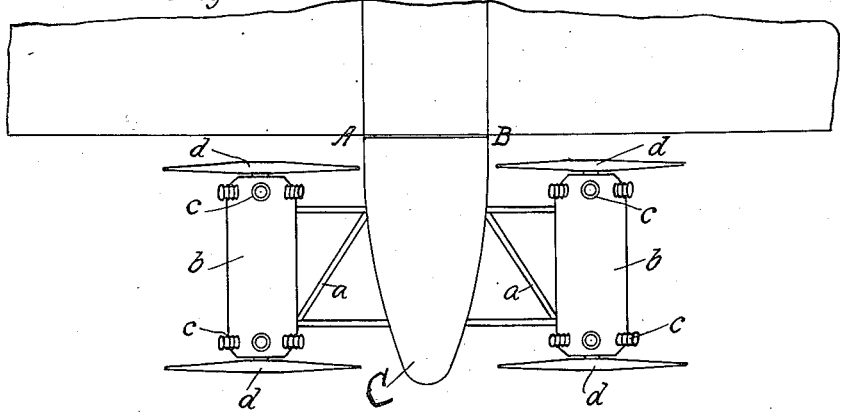
Fig. 2 is the same airplane seen from above, the front body-end C being detachable from the body at the groove A—B.
Figure 3:
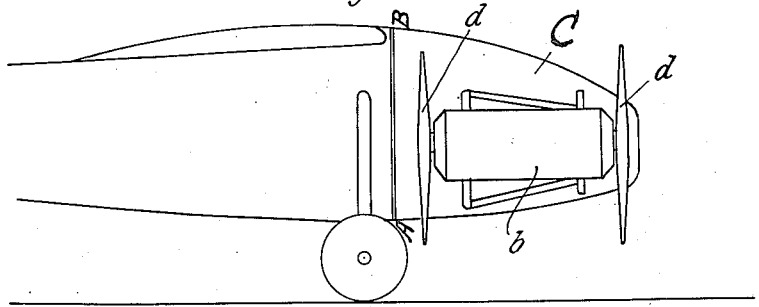
Fig. 3 is a lateral view of the same airplane.

At the front body-end C lateral outriggers $a$ are provided carrying motor-cars $b$, each with one motor $c$ with air-propellers $d$ at the front and rear ends, the petrol- and oil-tanks being arranged in the detachable front part C.

What I claim is:

In an aeroplane comprising a main body, an end section detachably connected therewith, the end section having supporting upon each side a horizontally disposed laterally projecting frame, a motor car supported by each frame and extending longitudinally of the front section, each motor car having a motor in each end for driving a propeller at each end of each car, said frames supporting the motor cars below the longitudinal axes of the main body and the detachable end section and below the pilot's seat of the plane but in close proximity to said seat.

In testimony whereof I have signed my name to this specification.

CLAUDE DORNIER.